April 7, 1959     R. L. WALL     2,881,337
ACOUSTICALLY TREATED MOTOR
Filed July 1, 1957     2 Sheets-Sheet 1
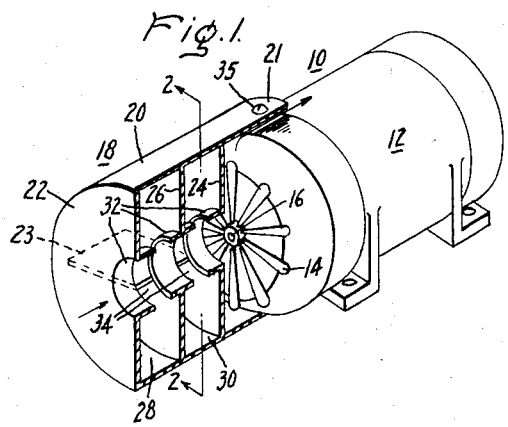
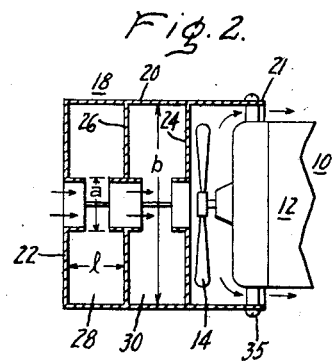
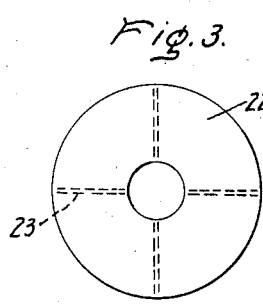
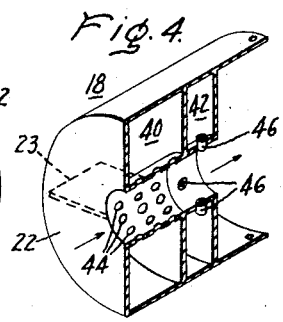
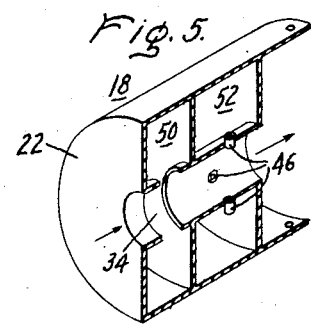
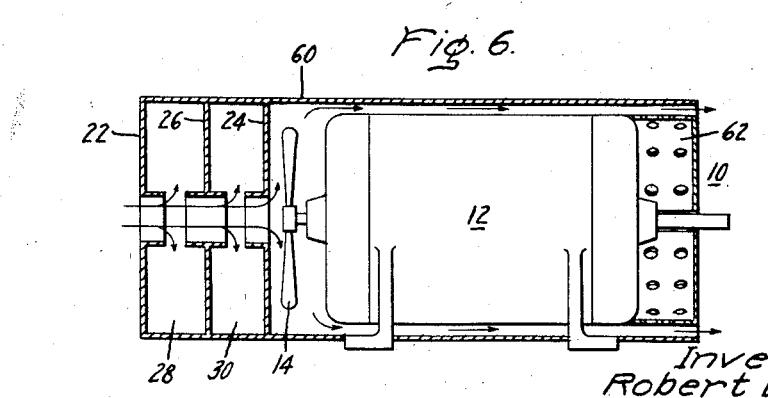
Inventor:
Robert L. Wall,
by Vernon F. Kalb
His Attorney.

April 7, 1959
R. L. WALL
2,881,337
ACOUSTICALLY TREATED MOTOR
Filed July 1, 1957
2 Sheets-Sheet 2
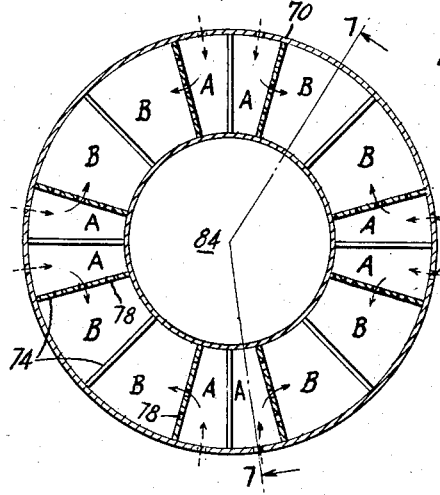
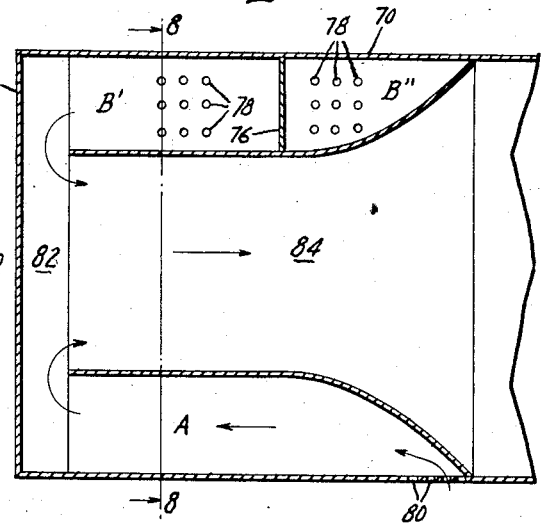
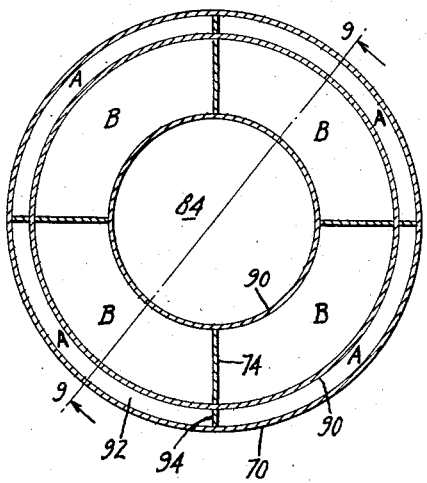
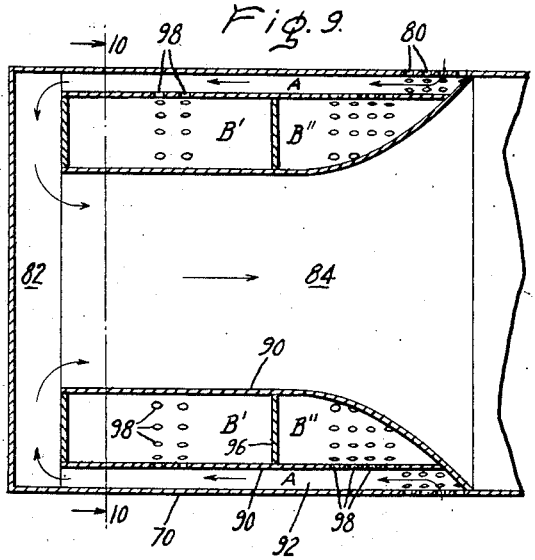
Inventor:
Robert L. Wall,
by Vernon H. Kalb
His Attorney.

United States Patent Office 2,881,337
Patented Apr. 7, 1959

2,881,337

ACOUSTICALLY TREATED MOTOR

Robert L. Wall, Schenectady, N.Y., assignor to General Electric Company, a corporation of New York Application July 1, 1957, Serial No. 669,021

4 Claims. (Cl. 310—57)

The invention described herein relates to dynamoelectric machines and more particularly to an acoustically treated motor designed to minimize air and self-generated noises produced by the machine during operation.

It is common practice to employ a shaft mounted fan on motors and other electrical rotating equipment for circulating air to carry away heat transmitted to the frame by the electrodynamically operating parts in the machine. As the fan blades rotate and produce the air flow required for ventilation, noises are imparted to it which fall within an audible frequency range and are often of a magnitude found to be objectionable when the motor is located in an area where low decibel noise levels are desirable. These noises generally can be attributed to sounds caused by air flowing through passages, those normally generated by the machine during operation and particularly by the fan which creates sound noise frequencies in accordance with its design. In an attempt to reduce the amplitude of these adverse noise frequencies, motors have been insulated with dissipative type mufflers consisting generally of sound absorbent material applied to the interior portions of the frame or component parts and located in the path of those sound noise frequencies created by the fan and in general by the machine. The latter insulation is made of glass wool, for example, or other kinds of material designed especially for this purpose.

The principal objections offered to this type of sound insulating material when applied to totally enclosed machines used in contaminated environments is that the air employed for ventilating the machine is often laden with moisture, dust or other foreign particles which adhere to the insulation, and in time, fill all the interstices provided in the insulation for sound absorption purposes, thereby reducing the sound absorbing efficiency. Also, the insulation must be made relatively thick in cross section in order to effectively carry out its function and since it must be mounted on the interior portions of the frame, space must be provided for it, thus resulting in a larger size machine, and reducing the total heat dissipating surface of the machine. Moreover, insulating a motor in accordance with this method is expensive.

Another type of muffler normally used for absorbing sound frequencies is known as a resonant muffler consisting generally of a closed chamber having openings thereinto which are designed to have the system resonate at the same frequency as the sound frequencies which are desired to be attenuated. The resonant muffler is particularly useful where a known range of sound frequencies are to be damped and is normally used in automobile engine exhaust systems and in jet engine testing facilities. The principles relating to its design have been utilized in providing the various mufflers described hereinafter.

Accordingly, the primary object of my invention is to minimize the magnitude of noise frequencies radiated by a motor by providing a sound absorbent device of the resonant type associated with the motor for attenuating those frequencies of high decibel levels.

In carrying out my invention, I eliminate the disadvantages of the prior art by enclosing a resonant muffler within a fan casing and in a position adjacent to the motor fan so that sound noises generated thereby, pass through the muffler prior to leaving the machine. The muffler is constructed to include a single or plurality of chambers having openings thereinto spaced along the path taken by noises radiated by the machine. These chambers are designed to resonate at the identical frequency, or within a range of requencies, the same as those comprising the noise being generated in the motor. As the noises pass through the muffler, the magnitude of sound waves at certain frequencies are reduced by virtue of the design of the chambers including the openings connecting the chambers with the path taken by the sound noises.

While the specification concludes with claims particularly pointing out and distinctly claiming the subject matter which I regard as my invention, it is believed the invention will be better understood from the following description taken in connection with the accompanying drawings in which:

Figure 1 is a perspective view of a motor showing the external fan and a cross sectional view of an expansion type of resonant muffler adapted for attenuating noises produced by the machine;

Figure 2 is a view taken on lines 2—2 of Figure 1;

Figure 3 is an end view of the muffler shown in Figures 1 and 2;

Figure 4 is a cross sectional view illustrating another type of resonant muffler;

Figure 5 is another modification illustrating a combined expansion and resonant type of muffler;

Figure 6 is a cross sectional view in elevation illustrating the arrangement of expansion and resonant type mufflers applied to opposite ends of a motor;

Figure 7 is a view taken on lines 7—7 of Figure 8 showing another modification of a resonant muffler including a plurality of chambers designed to have the ventilating air reverse itself on its path to the motor;

Figure 8 is a view taken on lines 8—8 of Figure 7;

Figure 9 is another modification of the type of muffler shown in Figure 7; and

Figure 10 is a view taken on lines 10—10 of Figure 9.

Referring now to the drawings wherein like reference characters designate like or corresponding parts throughout the several views, there is shown in Figures 1-3, a motor 10 comprising a frame 12 having a stator (not shown) and an external fan 14 mounted on a rotor shaft 16 extending outwardly from the motor enclosure. In the usual construction, a fan casing equipped with an overhanging flange extends over a portion of the exterior surface of the frame of the motor for diverting air from the fan thereacross in order to obtain proper cooling of the machine. The customary fan casing is replaced by a combined fan casing and muffler 18 comprising a cylindrical shell 20 provided with an air deflecting flange 21 and having ends 22 and 24 fitted in each end of the shell. A partition plate 26 coacts with the ends to form a pair of resonant chambers 28 and 30. As illustrated in Figure 1, the chambers are provided with a central opening extending axially of the rotor shaft and are equipped with a plurality of cylindrical members 32, which provide openings 34 extending from the circular opening into the chambers. The cylindrical members can be considered as a single shell having slots 34 communicating with the chambers 28 and 30. The muffler 18 is arranged for connection to the end of the motor in any well known manner as by bolts 35 or other securing means. In operation, as the rotor rotates the fan blades 14 create a suction on air outside the machine and draw it through the central opening provided in the muffler prior to discharging it along the exterior surface of the motor frame as illustrated by the arrows in Figure 2.

As the air flows into the opening and is diverted by the fan, certain sound waves comprising the noise are imparted to the air having frequencies depending on the velocity of air, the design and number of fan blades, fan blade diameter, fan speed and other factors inherent in any particular installation. These sound noises are within the audible frequency range and the major noise levels are provided by dominant sound frequencies and their harmonics. These sound frequencies imparted to the air by the fan blades and those self-generated air noises of broad band character can be measured and a determination made as to how the muffler should be designed in order to attenuate the dominant frequencies and others that fall within an undesirable range. The method of calculating and determining the magnitude of all frequencies, in absence of sound measuring instruments, is well known, and since a sound spectrum can be obtained readily, a determination can be made as to what part of the machine should be acoustically treated.

The procedures involved in the design of resonant type mufflers is thoroughly covered in text books, but the basic concept employed is that of providing a closed chamber having orifices or ports opening thereinto which are arranged for contact by the sound noises emanating from the machine, either those air noises created by the fan or broad band type of noises generated by air flow during machine operation. The combination of ports and chamber, or chambers, are designed to resonate at a natural frequency although the design will effectively cover a range of frequencies. In practice, measurements are made with a view towards determining the range of the frequencies of the sound waves resident in the circular passage extending to the fan blades. Knowing this range of frequencies, the chamber and the ports are then designed so that the natural frequency of the chambers falls within the range of frequencies it is desired to attenuate, and preferably within the range of the dominant sound waves, with the result that the sound waves are damped and thereby reduced to a minimum value.

An expansion type of muffler is shown in Figure 1 which is designed to resonate through a range of frequencies as determined by the length 1 among other factors, indicated in Figure 2. The significant characteristic of this type of muffler is that the attenuation increases as the expansion ratio $a:b$ also increases and that the attenuation curve is cyclic, thus repeating itself at frequency intervals determined by the length of the expansion chamber. Varying only the length of the expansion chamber does not affect the peak attenuation. However, the frequency at which the peak occurs is reduced as the length of the chamber is increased, and is inversely proportional to the chamber length.

Referring to the modification shown in Figure 4, there is shown a pair of resonant chambers 40 and 42 constructed in somewhat the same manner as the expansion chambers shown in Figures 1–3, except that chamber 40 is provided with a plurality of orifices or ports 44 while chamber 42 is equipped with hollow plugs 46. These ports and plugs are designed in a manner to coact with the chambers 40 and 42 in order to provide a structure which will resonate over a band of frequencies within the range of frequencies comprising the noise spectrum produced by the machine. As is evident, this muffler is adapted for attachment to the motor 12 in the same manner as muffler 18 shown in Figure 1.

In the modification of Figure 5, combined expansion and resonant chambers 50 and 52 of the type discussed above are provided, wherein chamber 50 is employed to reduce the pressure of sound waves emanating from the motor, while chamber 52 supplements the action of the expansion chamber.

Referring to the embodiment shown in Figure 6, there is shown a motor 10 having a frame 12 and fan blades 14 in the manner as previously described. The acoustic treatment given the machine in this embodiment consists of an expansion muffler 60 located on the fan end of the motor, and a resonant type muffler 62 attached to the pulley end of the motor. Obviously, these two mufflers can be interchanged if desired. They may be designed and constructed as a single unit as shown, or they may be separately attached to the opposite ends of the motor so long as there is an enclosed communicating air path existing therebetween. In the specific example, the muffler is shown as an integral unit wherein air is arranged to enter through the expansion muffler prior to being forced outwardly by fan 14 and then along the outer surface of frame 12, and the noise frequencies carried by the air and those existing in the air duct will be attenuated by both the expansion and resonant mufflers 60 and 62 on the opposite ends of the machine. The action and effect of these two mufflers is the same as that previously described, but since a muffler is located on each end of the machine, a more complete soundproofing installation results. Also, it will be apparent that a combined expansion and resonant muffler may selectively be attached to either or both ends of the machine as shown in these figures.

A slightly different arrangement is illustrated in Figures 7 and 8 wherein multiple-resonant chambers are employed for attenuating sound noises over a large frequency range. The muffler consists of a shell 70 open on one end for attachment to the motor frame while the other end is closed by a plate 72. As shown in Figure 8, a plurality of compartments are formed within shell 70 by partitions 74. The compartments designated A are employed as air ducts carrying the motor ventilating air and each is provided with an adjacent muffler B designed to attenuate the noises radiated into the air ducts by the motor. In order to attenuate frequencies over a large range, each chamber B is divided into two sections B' and B" by a plate 76 thus permitting each section to be tuned at different frequencies. In one embodiment, the sections were tuned at 1200 and 2400 c.p.s. respectively for attenuating sound noises within this band of frequencies. Obviously, the dividing plate 76 may be omitted and the chamber designed to attenuate noises within a single range of frequencies; or more than two sections may be provided to function over a wide frequency range.

Since the resonant frequency of the B chambers is determined in part by the acoustic conductivity of the orifices, the design of each section is calculated to provide the correct number of orifices spaced at predetermined intervals. These orifices are indicated at 78. Upon installation of the muffler on a motor, ventilating air is drawn by the motor fan through openings 80 entering into the air ducts A and through an expansion area 82 prior to delivery through the main duct 84 to the fan (not shown). It will be noted that the air is caused to reverse itself in flowing to the motor and that the radiated sound path is in reverse to the air flow path. As the sound noises travel through the ducts A, the undesirable frequencies are attenuated by the muffler sections B' and B" in the manner previously described.

The muffler in Figures 9 and 10 is somewhat similar to that of the previous embodiment in that a shell 70 is provided having air intake openings 80 on its peripheral surface for permitting entry of ventilating air which reverses itself before delivery to the motor. As shown in Figure 10, the chamber 90 is spaced inwardly from the shell 70 to provide air ducts 92 formed by partition plates 94 extending the length of the muffler. The chamber 90 is of a resonant type similar to that described and illustrated in Figure 4 and in order to provide for attenuation over a large frequency range, the chamber may be divided into two or more sections by a dividing plate 96 and tuned at different frequencies as described above. Orifices 98 are located in the exterior portions of chamber 90 so that sound noises emanating outwardly must travel to and through the air ducts 92 before being attenuated.

Obviously many modifications and variations are possible in light of the above teachings. It therefore is to be understood that within the scope of the appended claims, the invention may be practiced otherwise than as specifically described.

What I claim as new and desire to secure by Letters Patent of the United States is:

1. An acoustically treated motor comprising a frame supporting a rotor and a stator and a fan connected to one end of said rotor, a combined muffler and fan casing enclosing said fan and being provided with a flange overlying an end of said frame for diverting air from said fan across the frame for carrying away heat generated by the motor during operation, the muffler portion of said combined muffler and fan casing comprising an outer shell having a wall oppositely disposed from said fan and provided with a central opening therein, a partition in said muffler providing a plurality of chambers, inner shell means centrally disposed in said outer shell and in axial alignment with said fan and said central opening for providing a ventilating passageway for the motor, openings in said inner shell means communicating with said chambers, said openings and said chambers being designed to resonate in the same frequency range as sound noises generated by said motor so as to attenuate the dominant frequencies comprising said noise.

2. An acoustically treated motor comprising a frame having a rotor and a stator and a ventilating fan mounted on one end of a said rotor, a combined muffler and fan casing enclosing said fan and attached to said motor for directing air from the fan over the frame for carrying away heat during operation, the muffler comprising an outer shell closed at one end by a wall having a central opening disposed therein, an inner hollow shell fitted within the opening in said wall and terminating at its other end adjacent the intake to the fan, said inner shell and said outer shell being arranged to form a chamber therebetween, a partition plate dividing said chamber into a pair of sound resonating chambers, orifices in the walls of said inner shell communicating with said resonating chambers and being designed in a manner to resonate in a predetermined range of frequencies, whereby noise radiated outwardly from said machine during operation are attenuated by said chambers.

3. An acoustically treated motor comprising a rotor and a stator and a fan connected to one end of said rotor, a shell enclosing but being spaced from the frame of said motor to provide a path for ventilating air directed thereacross by said fan, sound attenuating mufflers mounted within said shell and respectively positioned on opposite ends of the motor, the muffler on the fan end comprising a pair of adjacent chambers axially disposed with respect to said fan and being provided with a central passageway formed by walls within said shell for providing ventilating air to said fan, openings in said passageway communicating with said chambers, said openings and chambers being designed to attenuate sound noises within a predetermined frequency range so that sounds radiated by said motor are attenuated thereby during motor operation, the muffler on the opposite end of said motor comprising a hollow cylindrical chamber mounted within said shell and having a diameter less than said shell so as to provide an exit for ventilating air directed across the motor frame by said fan, and orifices in an outer wall of said hollow chamber designed to coact therewith to provide a sound resonating area capable of attenuating sound noises radiated by the motor during operation.

4. An acoustically treated motor comprising a rotor and a stator and a fan connected to one end of said rotor, a combined muffler and fan casing enclosing said fan and attached to said motor for directing ventilating air thereacross during motor operation, said muffler comprising an outer shell closed at one end and having a concentrically disposed inner shell positioned therein, a plurality of partitions extending radially between said inner shell and said outer shell to provide a plurality of chambers, orifices disposed in each alternate wall of said partitions for establishing communication between pairs of chambers, said orifices and chambers being designed to resonate in a predetermined frequency range while each adjacent chamber comprises an air duct for providing air to said motor, so that noises radiated by said motor travel through said air ducts and are attenuated by the chambers having the orifices disposed therein.

References Cited in the file of this patent

UNITED STATES PATENTS

| | | |
|---|---|---|
| 2,116,751 | Deremer | May 10, 1938 |
| 2,161,027 | Dollinger | June 6, 1939 |
| 2,225,398 | Hamblin | Dec. 17, 1940 |
| 2,252,256 | Harris | Aug. 12, 1941 |
| 2,508,207 | Woll | May 16, 1950 |
| 2,731,194 | Kent | Jan. 17, 1956 |

FOREIGN PATENTS

| | | |
|---|---|---|
| 94,086 | Switzerland | Apr. 1, 1922 |